US012056168B2

(12) United States Patent
Hasegawa et al.

(10) Patent No.: US 12,056,168 B2
(45) Date of Patent: Aug. 6, 2024

(54) LEARNING APPARATUS, SEARCH APPARATUS, LEARNING METHOD, SEARCH METHOD AND PROGRAM

(71) Applicant: NIPPON TELEGRAPH AND TELEPHONE CORPORATION, Tokyo (JP)

(72) Inventors: Taku Hasegawa, Tokyo (JP); Kyosuke Nishida, Tokyo (JP); Junji Tomita, Tokyo (JP); Hisako Asano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/795,868

(22) PCT Filed: Jan. 29, 2020

(86) PCT No.: PCT/JP2020/003097
§ 371 (c)(1),
(2) Date: Jul. 27, 2022

(87) PCT Pub. No.: WO2021/152715
PCT Pub. Date: Aug. 5, 2021

(65) Prior Publication Data
US 2023/0072537 A1 Mar. 9, 2023

(51) Int. Cl.
*G06F 16/31* (2019.01)
*G06F 16/33* (2019.01)
*G06N 3/02* (2006.01)

(52) U.S. Cl.
CPC .......... *G06F 16/3331* (2019.01); *G06F 16/31* (2019.01); *G06N 3/02* (2013.01)

(58) Field of Classification Search
CPC ................. G06F 16/31; G06F 16/3331; G06F 16/24578; G06F 16/248; G06F 16/9038;
(Continued)

(56) References Cited

U.S. PATENT DOCUMENTS

| 6,189,002 B1 * | 2/2001 | Roitblat | G06F 16/313 707/E17.084 |
| 2010/0179933 A1 * | 7/2010 | Bai | G06F 16/313 707/742 |

(Continued)

FOREIGN PATENT DOCUMENTS

| WO | WO-2020242566 A1 * | 12/2020 | ............ G06F 16/313 |
| WO | WO-2021076606 A1 * | 4/2021 | ......... G06F 16/3335 |

OTHER PUBLICATIONS

Zamani et al. "From Neural Re-Ranking to Neural Ranking: Learning a Sparse Representation for Inverted Indexing" CIKM '18, Oct. 22-26, 2018, Torino, Italy (Year: 2018).*

(Continued)

*Primary Examiner* — Vaishali Shah
*Assistant Examiner* — Berhanu Mitiku

(57) ABSTRACT

A learning apparatus according to an embodiment has a feature generation means configured to take a search query, a first document related to the search query, and a second document that is not related to the search query as input, and generate a feature of the search query, a feature of the first document, and a feature of the second document, by using model parameters of a neural network, and an update means configured to take the feature of the search query, the feature of the first document, and the feature of the second document as input, and update the model parameters by using an error function including a cost function that is a differentiable approximation function of an L0 norm.

5 Claims, 8 Drawing Sheets

(58) Field of Classification Search
CPC ........ G06F 16/243; G06F 16/35; G06F 16/36; G06F 16/951; G06F 16/3344; G06F 16/3329; G06F 16/3347; G06F 16/954; G06F 16/313; G06F 16/38; G06N 3/02; G06N 3/0464; G06N 3/0475; G06N 3/0495; G06N 3/0499
See application file for complete search history.

(56) References Cited

U.S. PATENT DOCUMENTS

| | | | | |
|---|---|---|---|---|
| 2015/0169702 | A1* | 6/2015 | Hannan | G06F 16/951 707/722 |
| 2016/0155058 | A1* | 6/2016 | Oh | G06N 20/00 706/11 |
| 2019/0042892 | A1* | 2/2019 | Wolf | G06F 18/241 |
| 2019/0347256 | A1* | 11/2019 | Wu | G06F 16/2462 |

OTHER PUBLICATIONS

Blum et al. "Selection of relevant features and examples in machine learning" Artificial Intelligence 97 ( 1997) 245-271 1997 Blsevier Science B.V (Year: 1997).*

Kotsiantis.pdf "Feature selection for machine learning classification problems: a recent overview" Springer Science+Business Media B.V. 2011 Educational Software Development Laboratory, Department of Mathematics, University of Patras, P.A. Box: 1399, 26 500 Rio, Greece (Year: 2011).*

Hu_et_al.pdf "FDML: A Collaborative Machine Learning Framework for Distributed Features" KDD '19, Aug. 4-8, 2019, Anchorage, AK, USA 2019 Association for Computing Machinery. ACM ISBN 978-1-4503-6201-6/19/08 (Year: 2019).*

Khalid_et_al.pdf "A Survey of Feature Selection and Feature Extraction Techniques in Machine Learning" Science and Information Conference Aug. 27-29, 2014, 2014 | London, UK (Year: 2014).*

Zamani et al. (2018) "From Neural Re-Ranking to Neural Ranking: Learning a Sparse Representation for Inverted Indexing", Proceedings of the 27th ACM International Conference on Information and Knowledge Management, pp. 497-506.

Devlin et al. (2018) "Bert: Pre-training of deep bidirectional transformers for language understanding" arXiv preprint arXiv: 1810.04805, (This Reference is updated to 2019 ver. as of now.).

Vaswani et al. (2017) "Attention Is All You Need" arXiv preprint arXiv: 1706.03762.

Baja et al. (2018) "MS MARCO: A Human Generated Machine Reading Comprehension Dataset" arXiv preprint arXiv: 1611.09268.

* cited by examiner

LEARNING APPARATUS, SEARCH APPARATUS, LEARNING METHOD, SEARCH METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/003097, filed on 29 Jan. 2020, the disclosure of which is hereby incorporated herein by reference in its entirety.

TECHNICAL FIELD

The present invention relates to a learning apparatus, a search apparatus, a learning method, a searching method and a program.

BACKGROUND ART

In document search, it is required to extract documents related to a search query from a large number of documents at a high speed. As a technology to realize the requirement, there is known a technology for performing document search with the term included in a search query by creating an inverted index with a term included in a document as a key, and a document number of the document including the term as a value, and thereafter using the inverted index, for example.

Furthermore, when document search is performed by exact term matching, a search omission can occur due to vocabulary ambiguity, notation variation and the like. Accordingly, as a technology that can perform document search without exact term matching, there is known a technology that performs document search by creating an inverted index by regarding a vector obtained in a neural network as a latent term vector (for example, Non-Patent Literature 1).

CITATION LIST

Non-Patent Literature

Non-Patent Literature 1: H. Zamani, M. Dehghani, W. B. Croft E. Learned-Miller and J. Kamps, "From Neural Re-Ranking to Neural Ranking: Learning a Sparse Representation for Inverted Indexing", Proceedings of the 27th ACM International Conference on Information and Knowledge Management, Pages 497-506, 2018.

SUMMARY OF THE INVENTION

Technical Problem

However, in the technology described in Non-Patent Literature 1 described above, in order to realize high-speed search using the inverted index, sparsity of the vector obtained in the neural network is evaluated based on approximation of an L1 norm that is differentiable. Accordingly, the vector obtained in the neural network may not be able to acquire sparsity sufficiently.

On the other hand, it is impossible to evaluate sparsity by directly calculating an L0 norm within a framework of the current neural network technology from the viewpoint of differentiability.

An embodiment of the present invention has been made in the light of the above described point, and has an object to stably acquire sparsity of a vector obtained in a neural network in document search using an inverted index.

Means for Solving the Problem

In order to attain the above described object, a learning apparatus according to an embodiment includes a feature generation means configured to take a search query, a first document related to the search query and a second document that is not related to the search query as input, and generate a feature of the search query, a feature of the first document, and a feature of the second document, by using model parameters of a neural network, and an update means configured to take the feature of the search query, the feature of the first document, and the feature of the second document as input, and update the model parameters by using an error function including a cost function that is a differentiable approximation function of an L0 norm.

Effects of the Invention

In document search using the inverted index, sparsity of the vector obtained in the neural network can be stably acquired.

DESCRIPTION OF EMBODIMENTS

Hereinafter, an embodiment of the present invention will be described. In the present embodiment, a search apparatus 10 that searches for documents related to a search query from documents to be searched by using vectors obtained in a neural network and an inverted index will be described. Furthermore, an inverted index generation apparatus 20 that generates the inverted index, and a learning apparatus 30 that learns the neural network will be also described.

Note that in the present embodiment, the search apparatus 10, the inverted index generation apparatus 20, and the learning apparatus 30 will be described as different apparatuses respectively, but two or more apparatuses of these apparatuses may be realized by a same device. For example, the search apparatus 10 and the inverted index generation apparatus 20 may be realized by the same device, the inverted index generation apparatus 20 and the learning apparatus 30 may be realized by the same device, the learning apparatus 30 and the search apparatus 10 may be realized by the same device, or the search apparatus 10, the inverted index generation apparatus 20 and the learning apparatus 30 may be realized by the same device.

Embodiment 1

First, an embodiment 1 will be described. In the embodiment 1, a case of performing document search by the search apparatus 10 will be described. Here, with a document set to be searched as $\{D_1, \ldots, D_m\}$, the search apparatus 10 is assumed to receive a search query Q, and output an ordered set $\{D_1, \ldots, D_k\}$ of the documents related to the search query Q and an association degree thereof $\{S_1, \ldots, S_k\}$. Note that m is the number of documents to be searched, $k(k \leq m)$ is the number of documents related to the search query Q.

Note that the search query Q and each document D, to be searched (i=1, . . . , m) are texts (character strings). Further, the documents related to the search query Q are documents that are obtained as search results with respect to the search query Q.

<Entire Configuration of Search Apparatus 10>

Figure 1:
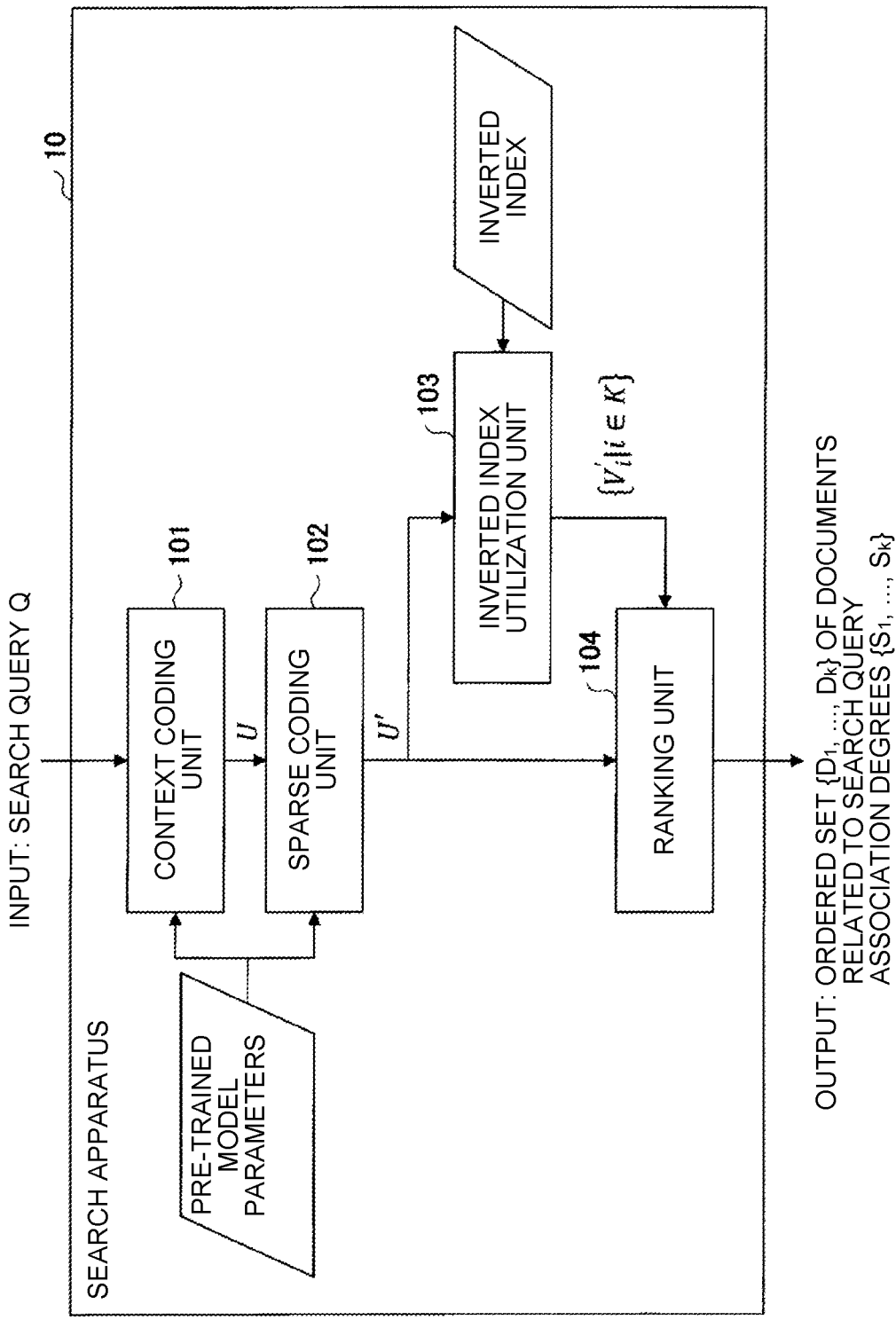
FIG. 1 is a diagram showing one example of an entire configuration of a search apparatus according to a present embodiment.

An entire configuration of the search apparatus 10 according to the present embodiment will be described with reference to FIG. 1. FIG. 1 is a diagram showing one example of the entire configuration of the search apparatus 10 according to the present embodiment.

As shown in FIG. 1, the search apparatus 10 according to the present embodiment has a context coding unit 101, a sparse coding unit 102, an inverted index utilization unit 103, and a ranking unit 104. Here, the context coding unit 101 and the sparse coding unit 102 are assumed to be realized in a neural network, and parameters thereof are assumed to be trained in advance. Hereinafter, parameters of the neural network that realize the context coding unit 101 and the sparse coding unit 102 are expressed as "model parameters". Note that the pre-trained model parameters are stored in an auxiliary storage device such as an HDD (Hard Disk Drive) or SSD (Solid State Drive), for example.

The context coding unit 101 takes the search query Q as input, and outputs a feature U of the search query Q by using the pre-trained model parameters.

Here, as the neural network that realizes the context coding unit 101, for example, BERT (Bidirectional Encoder Representations from Transformers) or the like can be used. BERT is a context-aware pre-trained model using Transformer, takes a text as input, and outputs a d-dimensional feature. By transforming the feature in one fully-connected neural network layer, BERT exhibits high performance in various tasks of natural language processing. For details of BERT, refer to, for example, Reference Literature 1 "J. Devlin, M.-W. Chang, K. Lee, and K. Toutanova, Bert: Pre-training of deep bidirectional transformers for language understanding. arXiv preprint arXiv: 1810.04805, 2018.", and the like. For details of Transformer, refer to, for example, Reference Literature 2 "Ashish Vaswani, Noam Shazeer, Niki Parmar, Jakob Uszkoreit, Llion Jones, Aidan N. Gomez, Lukasz Kaiser, Illia Polusukhin. Attention Is All You Need. arXiv preprint arXiv: 1706.03762, 2017." and the like.

When BERT is used as the neural network that realizes the context coding unit 101, the search query Q has a CLS tag added to a head of a sentence and a SEP tag added to an end of the sentence, and thereafter is inputted to the context coding unit 101.

Note that BERT is one example, and as the neural network that realizes the context coding unit 101, another context-aware pre-trained model using Transformer may be used. More generally, as the neural network that realizes the context coding unit 101, any neural network that can encode a text may be used. However, by realizing the context coding unit 101 by the context-aware pre-trained model such as BERT, it is possible to obtain a feature considering the entire context. Hereinafter, the context coding unit 101 is assumed to be realized by BERT, and the feature U is assumed to be a d-dimensional vector.

The sparse coding unit 102 takes the feature U of the search query Q as input, and outputs a sparse feature U' of the search query Q by using pre-trained model parameters.

Here, as the neural network that realizes the sparse coding unit 102, for example, a model of a fully connected layer described in Non-Patent Literature 1 described above can be used. More specifically, it is possible to use a model in which several fully connected layers (for example, about three to five layers) are stacked so that a number d' of dimensions of the sparse feature U' becomes larger than a number d of dimensions of the feature U, and an activation function of a final layer of these fully connected layers is a ReLu function. By making the activation function of the final layer a ReLu function, it is possible to obtain the sparse feature U' having zero as an element (that is, it is possible to acquire sparse representation ability).

Note that the model described in Non-Patent Literature 1 described above is one example, and as the neural network that realizes the sparse coding unit 102, it is possible to use any model as long as it is a model in which an output dimension is higher than an input dimension, and an ordinary activation function f: $R \rightarrow R$ that satisfies all the following Condition 1-1 to Condition 1-3 is used as a final layer.

Condition 1-1: for all x, $f(x) \geq 0$
Condition 1-2: f is a monotonically increasing function
Condition 1-3: There must be $a \in R$ that satisfies $f(a)=0$ Further, the number d' of dimensions of the sparse feature U' is preferably as high as possible. However, although the representation ability of the sparse feature U' increases with a higher number d' of dimensions, calculation cost for calculating the sparse feature U', training cost for training the model parameters and the like increase. Furthermore, the amount of information contained in the document set to be searched and the allowable calculation cost may vary depending on the situation, and the number d' of dimensions is not always the same as the number of dimensions of a space where a codomain of a map by the neural network that realizes the sparse coding unit 102 extends (that is, a rank of a representation matrix of the map). Accordingly, the number d' of dimensions to be set may vary depending on, for example, an amount of information possessed by the document set to be searched, available calculation resources, and the like.

Note that in the present embodiment, the context coding unit 101 and the sparse coding unit 102 are expressed as different functional units for convenience, but the context coding unit 101 and the sparse coding unit 102 may be one functional unit.

The inverted index utilization unit 103 takes the sparse feature U' as input, and obtains a subset $\{V'_i | i \in K\}$ of sparse features of the documents to be searched by using the inverted index that is generated in advance. "K" satisfies

|K|=k, and is a set of indexes of the documents (or, document numbers, document IDs or the like) related to the search query Q. A sparse feature V'$_i$ of a document to be searched is a d'-dimensional vector obtained by inputting the document $D_i$ to be searched in the context coding unit 101 and the sparse coding unit 102. Hereinafter, V'i is expressed as V'$_i$=(v'$_{i1}$, v$_{i2}$, ..., v'$_{id'}$) with respect to i=1, ..., m. The index of the document is expressed as the "document index". Note that the inverted index is stored in an auxiliary storage device such as an HDD and SSD, for example.

Here, the inverted index according to the present embodiment is information where each of dimensions 1, 2, ..., d' (that is, indexes of dimensions, or dimension numbers) of the sparse feature is used as a key, and a set expressed by {(i, V'$_{ir}$)|v'$_{ir}$≠0}$_{i \in \{1, ..., n\}}$ concerning the key r is set as values. In this regard, the inverted index utilization unit 103 acquires a set of values {(i, V'$_{ir}$)|v'$_{ir}$≠0}$_{i \in \{1, ..., m\}}$ from the inverted index with respect to each dimension r that satisfies u'$_r$≠0 as the key, with respect to the sparse feature U'=(u'$_1$, u'$_2$, ..., u'$_{d'}$). The inverted index utilization unit 103 then obtains the subset {V'$_i$|i∈K} of the sparse features of the documents to be searched, with a set of all document indexes contained in the acquired set of the values as K.

The ranking unit 104 takes the sparse feature U' of the search query Q and the subset {V'$_i$|i∈K} of the sparse features of the documents to be searched as input, and outputs an ordered set {$D_i$|i∈K} of documents related to the search query Q (Hereinafter, also expressed as "related documents".) and an association degree {$S_i$|i∈K} thereof. Note that the ordered set {$D_i$|i∈K} of the related documents is a set ordered in ascending or descending order of the association degree $S_i$.

Here, the ordered set {$D_i$|i∈K} of the related documents and the association degree {$S_i$|i∈K} thereof can be respectively expressed as {$D_1$, ..., $D_k$} and {$S_1$, ..., $S_k$} by renumbering the document indexes. The association degree $S_i$ between the search query Q and the document $D_i$ is calculated by $S_i$=d (U', V'$_i$) by using an appropriate distance function d. As the distance function d, it is possible to use an inner product distance or the like, for example. In this regard, as the distance function d, it is possible to use any distance function capable of measuring a distance between vectors.

<Search Process>

Figure 2:
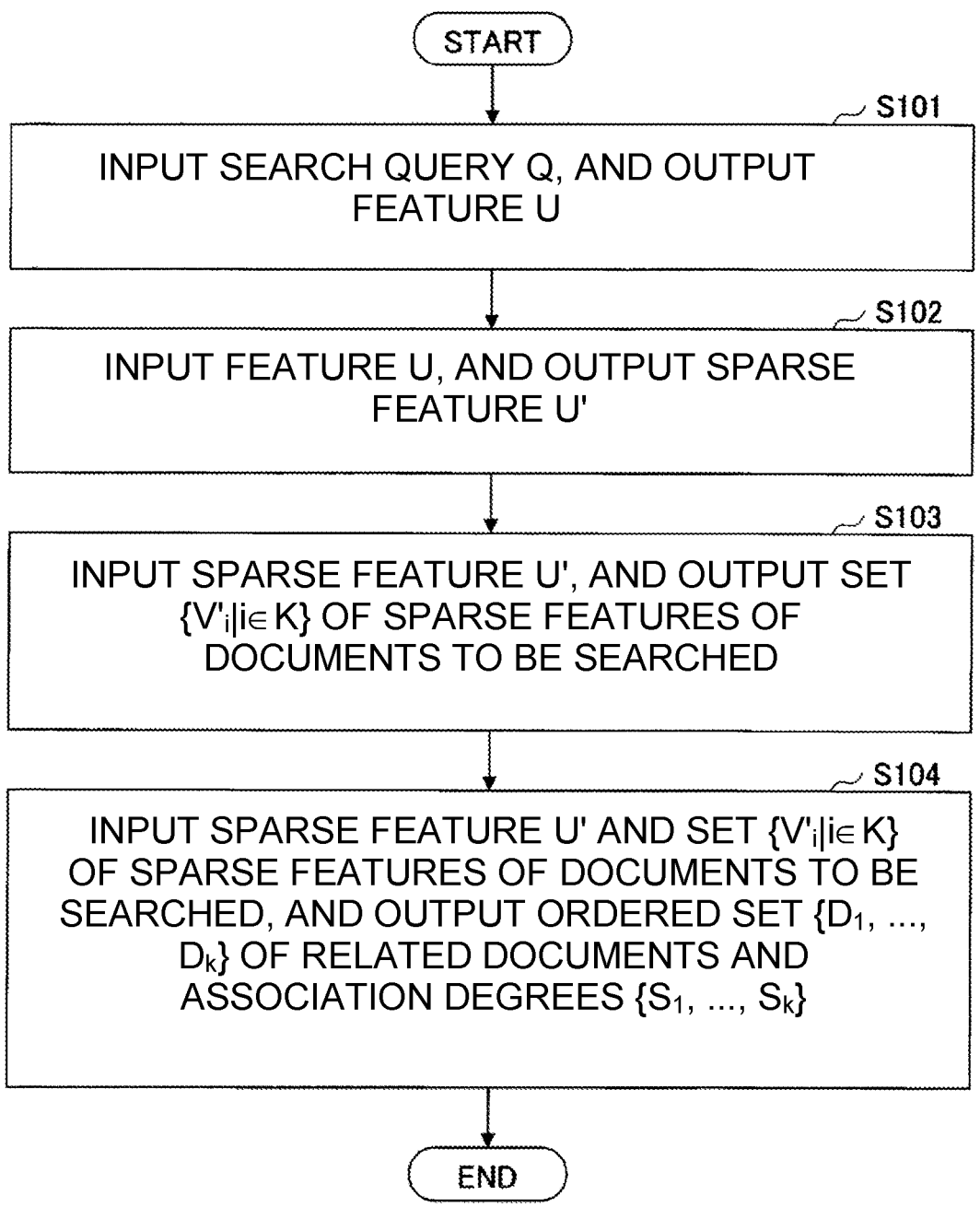
FIG. 2 is a flowchart showing one example of a search process according to the present embodiment.

A search process for obtaining the ordered set {$D_i$|i∈K} of the related documents of the inputted search query Q and the association degree {$S_i$|i∈K} thereof will be described with reference to FIG. 2. FIG. 2 is a flowchart showing one example of the search process according to the present embodiment.

Step S101: first, the context coding unit 101 takes the search query Q as input, and outputs the feature U of the search query Q by using the pre-trained model parameters.

Step S102: next, the sparse coding unit 102 takes the feature U obtained in step S101 described above as input, and outputs the sparse feature U' of the search query Q by using the pre-trained model parameters.

Step S103: next, the inverted index utilization unit 103 takes the sparse feature U' obtained in step S102 described above, and obtains the subset {V'$_i$|i∈K} of the sparse features of the documents to be searched by using the inverted index generated in advance.

Step S104: subsequently, the ranking unit 104 takes the sparse feature U' obtained in step S102 described above and the set {V'$_i$|i∈K} obtained in step S103 described above as input, and outputs the ordered set {$D_i$|i∈K} of the related documents of the search query Q and the association degree {$S_i$|i∈K} thereof.

Thus, the search apparatus 10 according to the present embodiment can obtain the ordered set {$D_i$|i∈K} of the documents related to the inputted search query Q and the association degree {$S_i$|i∈K} thereof. At this time, the search apparatus 10 according to the present embodiment can obtain the related documents and the association degrees thereof at a high speed without depending on the document amount of the documents to be searched by using the sparse feature U' of the search query Q and the inverted index generated in advance by the inverted index generation apparatus 20.

Embodiment 2

Next, an embodiment 2 will be described. In the embodiment 2, a case of generating the inverted index by the inverted index generation apparatus 20 will be described. Here, the inverted index generation apparatus 20 is assumed to receive a set {$D_i$, ..., $D^m$} of the documents to be searched, and output the inverted index.

<Overall Configuration of Inverted Index Generation Apparatus 20>

Figure 3:
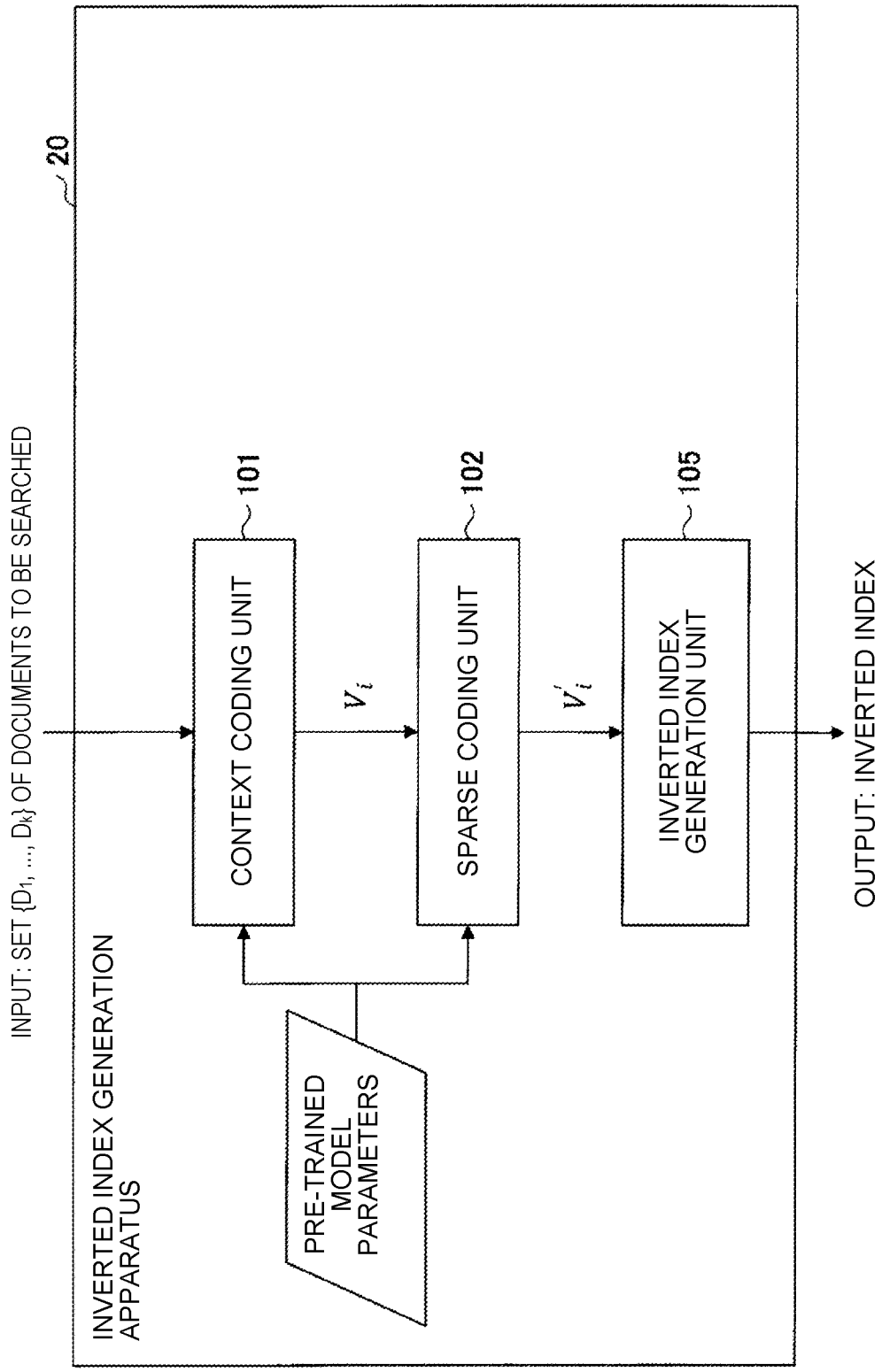
FIG. 3 is a diagram showing one example of an entire configuration of an inverted index generation apparatus according to the present embodiment.

An overall configuration of the inverted index generation apparatus 20 according to the present embodiment will be described with reference to FIG. 3. FIG. 3 shows one example of the overall configuration of the inverted index generation apparatus 20 according to the present embodiment.

As shown in FIG. 3, the inverted index generation apparatus 20 according to the present embodiment has a context coding unit 101, a sparse coding unit 102, and an inverted index generation unit 105. Here, the context coding unit 101 and the sparse coding unit 102 are realized by the same neural network as the neural network of the context coding unit 101 and the sparse coding unit 102 described in the embodiment 1, and model parameters thereof are assumed to be trained in advance.

The context coding unit 101 takes a document $D_i$ to be searched as input, and outputs a feature $V_i$ of the document $D_i$ to be searched by using the pre-trained model parameters.

The sparse coding unit 102 takes the feature $V_i$ of the document $D_i$ to be searched as input, and outputs a sparse feature V'$_i$ of the document $D_i$ to be searched by using the pre-trained model parameters.

The inverted index generation unit 105 takes a set {V'$_1$, ..., V'$_m$} of the sparse features of the respective documents $D_i$ (i=1, ..., m) to be searched as input, and generates and outputs an inverted index. As described above, the inverted index is information in which the index of the dimension or the dimension number of the sparse feature is used as a key, and a set expressed by {(i, m)} with respect to the key r is set as values. Therefore, the inverted index generation unit 105 determines whether each element v'$_{ir}$ (r=1, ..., d') of each sparse feature V'$_i$ (i=, ..., m) satisfies v'$_{ir}$=0, and when v'$_{ir}$≠0, the inverted index generation unit 105 generates the inverted index by adding v$_{ir}$ to the set of the values in which r is the key.

<Inverted Index Generation Process>

Figure 4:
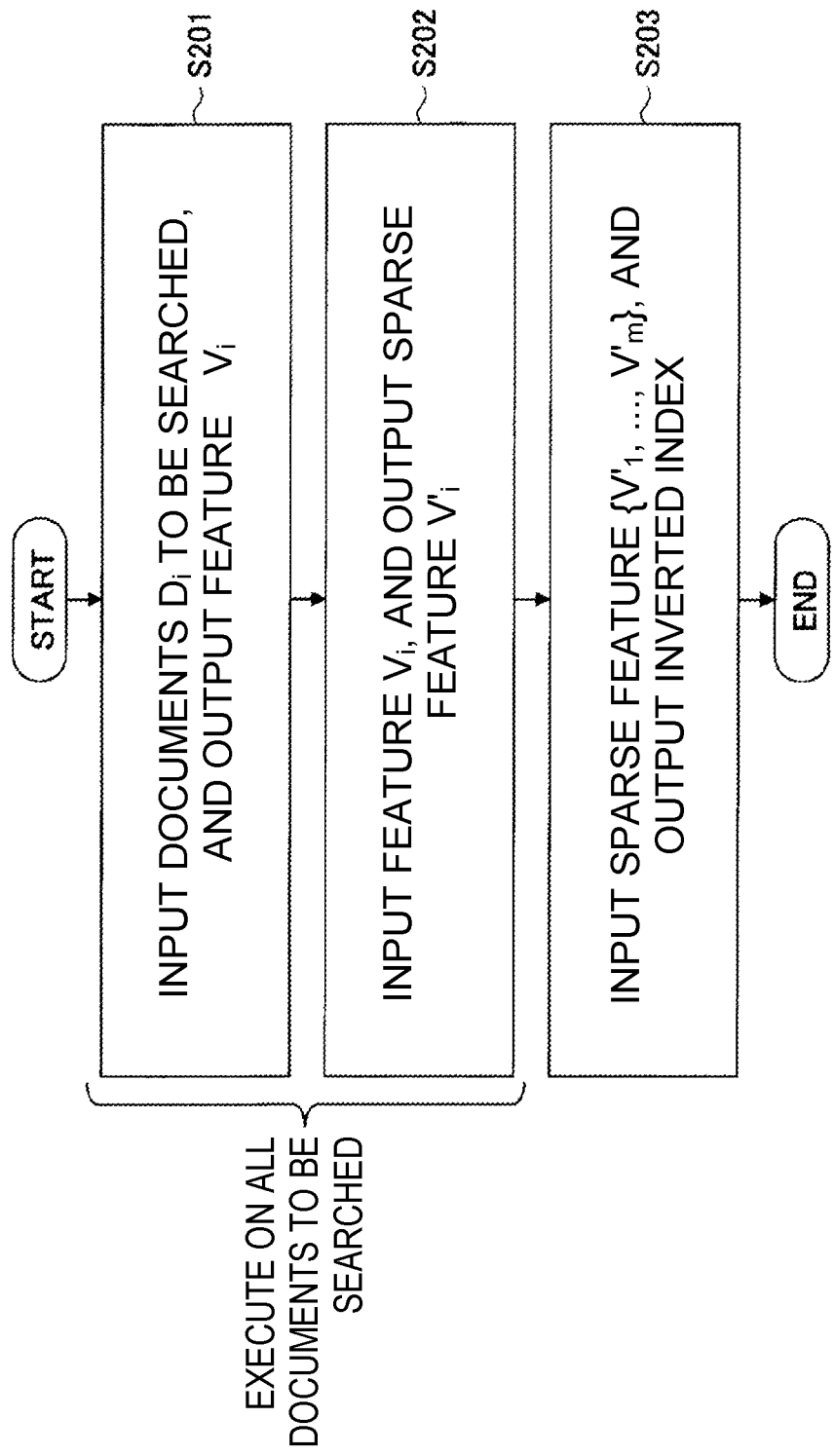
FIG. 4 is a flowchart showing one example of an inverted index generation process according to the present embodiment.

An inverted index generation process for generating the inverted index from the set {$D_i$, ..., $D_m$} of the inputted documents to be searched will be described with reference to FIG. 4. FIG. 4 is a flowchart showing one example of the inverted index generation process according to the present embodiment. Note that the inverted index generation process is executed, after a training process described later ends and before the aforementioned search process is executed.

Step S201: first, the context coding unit 101 takes the document $D_i$ to be searched as input, and outputs the feature $V_i$ of the document $D_i$ to be searched by using the pre-trained model parameters.

Step S202: next, the sparse coding unit 102 takes the feature $V_i$ of the document $D_i$ to be searched as input, and outputs the sparse feature $V'_i$ of the document $D_i$ to be searched by using the pre-trained model parameters.

Step S201 and step S202 described above are repeatedly executed on all the documents $D_i$ to be searched (i=1, ..., m).

Step S203: the inverted index generation unit 105 takes the set of the sparse features $\{V'_1, \ldots, V'_{m'}\}$ of the respective documents $D_i$ to be searched (i=1, ..., m) as input, and generates and outputs the inverted index.

Thus, the inverted index generation apparatus 20 according to the present embodiment can generate an inverted index from the inputted set $\{D_1, \ldots, D_{m'}\}$ of the documents to be searched. As described above, by using the inverted index, the search apparatus 10 can obtain the related documents and the association degrees thereof (that is, can search for the documents related to the search query Q) at a high speed without depending on the document amount of the documents to be searched.

Embodiment 3

Next, an embodiment 3 will be described. In the embodiment 3, a case of performing learning in a neural network (the neural network realizing the context coding unit 101 and the sparse coding unit 102) by a learning apparatus 30 will be described. Here, the model parameters are assumed not to have been trained yet in the embodiment 3, and the learning apparatus 30 is assumed to receive a training dataset, and train the model parameters. A training dataset is a set of training data used in training the model parameters.

In the present embodiment, the training dataset is assumed to be created in advance from the dataset described in Reference Literature 3 "Payal Baja", Daniel Campos, Nick Craswell, Li Deng, Jianfeng Gao, Xiaodong Liu, Rangan Majumder, Andrew McNamara, Bhaskar Mitra, Tri Nguyen, Mir Rosenberg, Xia Song, Alina Stoica, Saurabh Tiwary, Tong Wang, MS MARCO: A Human Generated MAchine Reading COmprehension Dataset, arXiv preprint arXiv: 1611.09268, 2018.".

The dataset described in Reference Literature 3 described above includes a search query set $R=\{Q_1, \ldots, Q_c\}$ and a set $G=\{D_1, \ldots, D_{m'}\}$ of documents to be searched. Here, "c" is the number of search queries, and "m'" is the number of documents to be searched. Note that m'=m may hold, or m'≠m may hold. m'≥m is preferable.

Furthermore, for the search query $Q_i$ (i=1, ..., c), a set of documents related to the search query $Q_i$: $G_i=\{D_j|D_j$ represents the document related to $Q_i\}$, is assumed to be labelled as correct data.

At this time, one document that is randomly extracted from the set $G_i$ of the documents related to the search query $Q_i$ is set as $D_i^+$, one document that is randomly extracted from a set $G\setminus G_i$ of the documents that are not related to the search query $Q_i$ is set as $D_i^-$, and $(Q_i, D_i^+, D_i^-)$ is set as training data (that is, data including the search query $Q_i$, a positive example thereof, and a negative example thereof is set as training data.). A set of the training data $\{(Q_i, D_i^+, =1, \ldots, c\}$ is used as a training dataset.

<Overall Configuration of Learning Apparatus 30>

Figure 5:
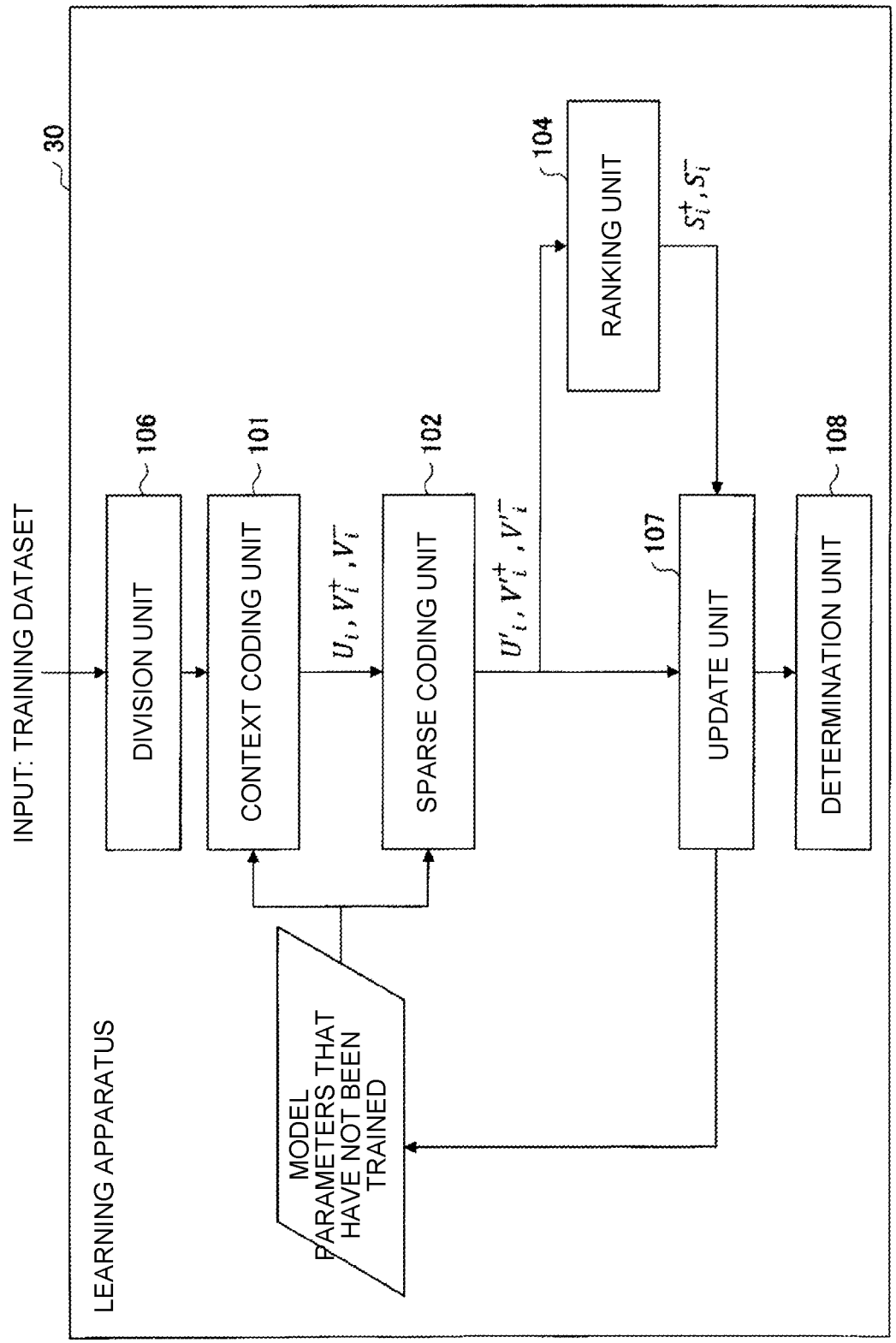
FIG. 5 is a diagram showing one example of an entire configuration of a learning apparatus according to the present embodiment.

An overall configuration of the learning apparatus 30 according to the present embodiment will be described with reference to FIG. 5. FIG. 5 is a diagram showing one example of the overall configuration of the learning apparatus 30 according to the present embodiment.

As shown in FIG. 5, the learning apparatus 30 according to the present embodiment includes a context coding unit 101, a sparse coding unit 102, a ranking unit 104, a division unit 106, an update unit 107, and a determination unit 108. Here, the context coding unit 101 and the sparse coding unit 102 are realized by the same neural network as the neural network of the context coding unit 101 and the sparse coding unit 102 described in the embodiments 1 and 2, but the model parameters thereof are assumed not to have been trained.

The division unit 106 takes the training dataset as input, and randomly divides the training dataset into a plurality of mini batches. In the present embodiment, the model parameters are repeatedly updated (trained) on a per mini batch basis.

The determination unit 108 determines whether end conditions for ending repetitive update of the model parameters is satisfied. Note that how many times one training data is repetitively trained is referred to as an epoch and the number of repetitions is referred to as a number of epochs.

The context coding unit 101 takes the training data ($Q_i$, $D_i^+$, $D_i^-$) as input, and outputs features ($U_i$, $V_i^+$, $V_i^-$) of the training data ($Q_i$, $D_i^+$, $D_i^-$) by using the model parameters that have not been trained. In other words, the context coding unit 101 takes the search query $Q_i$, the positive example $D_i^+$ and the negative example $D_i^-$ as input, and outputs the respective features $U_i$, $V_i^+$, and $V_i^-$.

The sparse coding unit 102 takes the features ($U_i$, $V_i^+$, $V_i^-$) of the training data ($Q_i$, $D_i^+$, $D_i^-$) as input, and outputs sparse features ($U'_i$, $V'^+_i$, $V'^-_i$) of the training data ($Q_i$, $D_i^+$, $D_i^-$) by using the model parameters that have not been trained. In other words, the sparse coding unit 102 takes the features $U_i$, $V_i^+$, and $V_i^-$ as input, and outputs the respective sparse features $U'_i$, $V'^+_i$, and $V'^-_i$.

The ranking unit 104 takes the sparse feature $U'_i$ of the search query $Q_i$, the sparse feature $V'^+_i$ of the positive example $D_i^+$, and the sparse feature $V'^-_i$ of the negative example $D_i^-$ as input, and outputs an association degree $S_i^+$ of the positive example $D_i^+$ with respect to the search query $Q_i$, and an association degree $S_i^-$ of the negative example $D_i^-$ with respect to the search query $Q_i$. Here, the association degrees $S_i^+$ and $S_i^-$ are calculated by $S_i^+=d(U'_i, V'^+_i)$ and $S_i^-=d(U'_i, V'^-_i)$ respectively by using the distance function d described above with respect to the embodiment 1.

The update unit 107 takes the sparse features $U'$, $V'^+_i$ and $V'^-_i$, and the association degrees $S_i^+$ and $S_i^-$ as input, and updates the model parameters by a supervised learning method. Here, as an error function of the supervised learning, an error function in ranking learning, and a cost function obtained from approximating an L0 norm by a differentiable function can be used.

More specifically, for the error function in ranking learning, a hinge loss described in Non-Patent Literature 1 described above (that is, expression (3) described in Non-Patent Literature 1) is used. The hinge loss is expressed by "hinge loss=max $\{0, \varepsilon-(S_i^+-S_i^-)\}$" by using a parameter e that is freely set.

As the cost function, in order to strictly consider sparsity, a modified function of a sigmoid function:

$$\sigma'(x) = \frac{2}{1+e^{-ax}} - 1 \quad (1)$$

is applied to respective elements of sparse features, and a function represented by a sum obtained by thus applying the modified function to the respective elements of the sparse features is used. In other words, $$\widetilde{L0}(X) = \sum_{r=1}^{d'} \sigma'(x_r) \quad (2)$$

is used as the cost function. Here, X represents a sparse feature $X=(x_1, \ldots, x_{d'})$, and "a" is a very large value. "a" may be set at a value that is $10^6$ times or more a maximum value of each element of all sparse features.

Thus, as the error function "loss" for the supervised learning, for example, expression (3) as follows can be used.

$$\text{loss} = \text{hinge loss} + \lambda(\widetilde{L0}(U'_i) + \widetilde{L0}(V'^+_i) + \widetilde{L0}(V'^-_i)) \quad (3)$$

Here, $\lambda$ is a parameter (learning coefficient) freely set.

By using the error function "loss" shown as the expression (3) described above (that is, the error function obtained from approximating an L0 norm by a differentiable function), it is possible to stably acquire the sparsity of the sparse features. In other words, by using the error function obtained from approximating an L0 norm by a differentiable function, zero elements of the sparse features can be increased while differentiability is guaranteed, and therefore, it is possible to improve the sparsity of the sparse features.

<Training Process>

Figure 6:
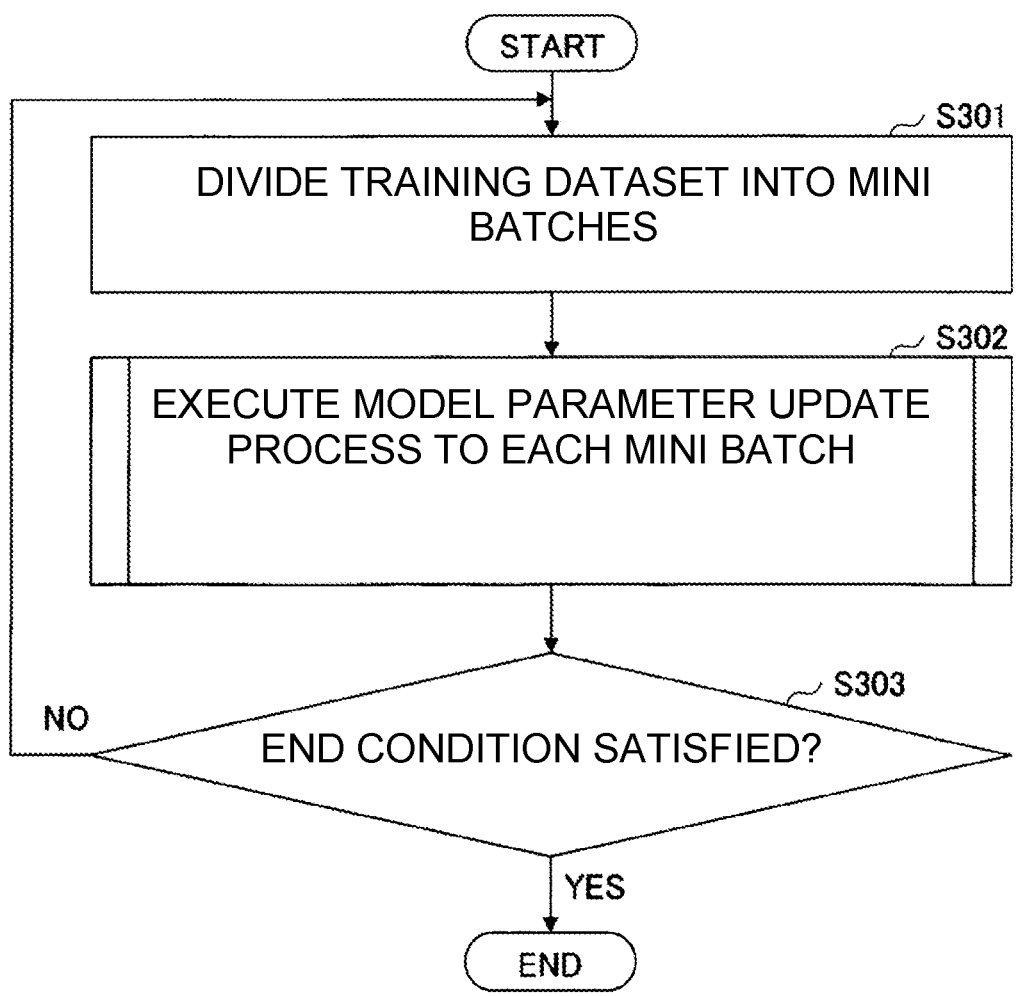
FIG. 6 is a flowchart showing one example of a training process according to the present embodiment.

A training process for training the model parameters using the inputted training dataset will be described with reference to FIG. 6. FIG. 6 is a flowchart showing one example of the training process according to the present embodiment. Note that the model parameters are initialized with appropriate values.

Step S301: first, the division unit 106 takes the training dataset as input, and randomly divides the training dataset into a plurality of mini batches.

Step S302: next, the learning apparatus 30 executes a model parameter update process on a per mini batch basis. Thus, the model parameters are updated by the model parameter update process. Details of the model parameter update process will be described later.

Step S303: the determination unit 108 determines whether predetermined end conditions are satisfied. When it is determined that the end conditions are satisfied (YES in step S303), the learning apparatus 30 ends the training process, whereas when it is determined that the end conditions are not satisfied (NO in step S303), the learning apparatus 30 returns to step S301. Thus, step S301 and step S302 are repeatedly executed until the predetermined end conditions are satisfied.

Note that as the predetermined end conditions, for example, conditions that the number of epochs reaches a predetermined first threshold or more, that the error function loss has converged (for example, a value of the error function becomes less than a predetermined second threshold, a change amount of the error function loss before versus after the update of the model parameters becomes less than a predetermined third threshold, or the like) or the like may be used.

<Model Parameter Update Process>

Figure 7:
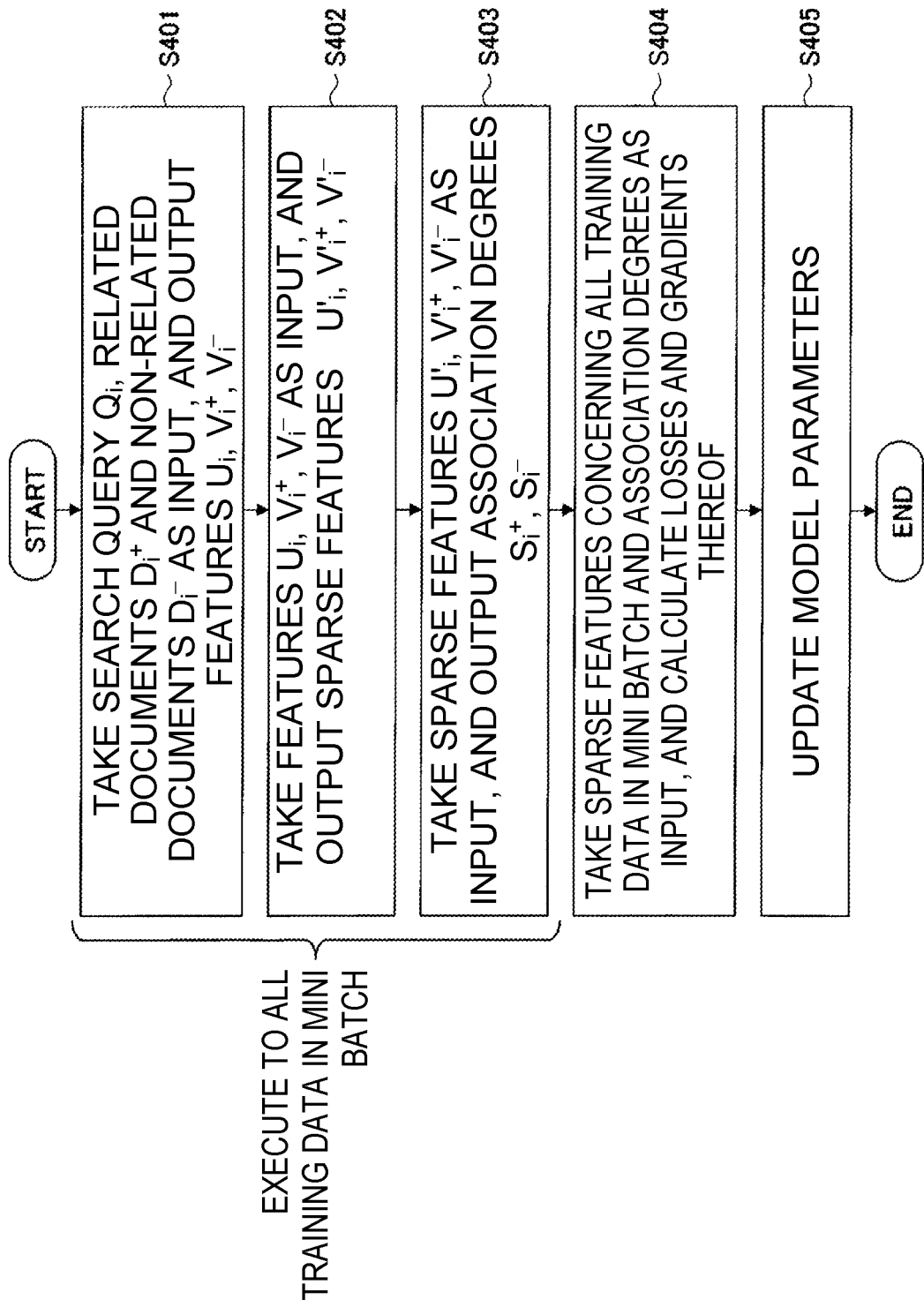
FIG. 7 is a flowchart showing one example of a model parameter update process according to the present embodiment.

The model parameter update process of step S302 described above will be described with reference to FIG. 7. FIG. 7 is a flowchart showing one example of the model parameter update process according to the present embodiment. Note that, hereinafter, a case of updating the model parameters by using a certain mini batch will be described.

Step S401: first, the context coding unit 101 takes the training data $(Q_i, D_i^+, D_i^-)$ of the mini batch as input, and outputs features $(U_i, V_i^+, V_i^-)$ of the training data $(Q_i, D_i^+, D_i^-)$ by using the model parameters that have not been trained.

Step S402: next, the sparse coding unit 102 takes the features $(U_i, V_i^+, V_i^-)$ of the training data $(Q_i, D_i^+, D_i^-)$ as input, and outputs sparse features $(U'_i, V'^+_i, V'^-_i)$ of the training data $(Q_i, D_i^+, D_i^-)$ by using the model parameters that have not been trained.

Step S403: next, the ranking unit 104 takes the sparse feature $U'_i$ of the search query $Q_i$, the sparse feature $V'^+_i$ of the positive example $D_i^+$, and the sparse feature $V'^-_i$ of the negative example $D_i^-$ as input, and outputs the association degree $S_i^+$ of the positive example $D_i^+$ with respect to the search query $Q_i$, and the association degree $S_i^-$ of the negative example $D_i^-$ with respect to the search query $Q_i$.

Step S401 to step S403 described above are repeatedly executed for all the training data $(Q_i, D_i^+, D_i^-)$ included in the mini batch.

Step S404: subsequently, the update unit 107 takes the respective sparse features obtained in step S402 described above, and the respective association degrees obtained in step S403 described above as input, and calculates values (that is, errors or losses) of the error function "loss" shown as the expression (3) described above and gradients of the error function "loss" concerning the model parameters, for example. Note that the gradients of the error function "loss" concerning the model parameters can be calculated by an error back propagation method or the like, for example.

Step S405: subsequently, the update unit 107 updates the model parameters by an any optimizing method using the values of the error function "loss" and the gradients thereof that are calculated in step S404 described above.

Thus, the learning apparatus 30 according to the present embodiment can train the model parameters of the neural network that realizes the context coding unit 101 and the sparse coding unit 102 by using the inputted training dataset. In this regard, in the present embodiment, it is possible to stably acquire sparsity of the sparse features obtained as output of the neural network by using the differentiable approximation function of an L0 norm as the cost function included in the error function.

Note that, in the present embodiment, mini batch learning is used in training the model parameters, but training the model parameter is not limited to this technique, and the model parameters may be trained by using another technique such as a batch learning technique, an online learning technique, or the like, for example.

Furthermore, in the present embodiment, the differentiable approximation function of an L0 norm is obtained using a function $\sigma'(x)$ (the expression (1) described above) obtained by modifying the sigmoid function. However, for example, in place of $\sigma'(x)$ shown in the expression (1) described above, an any function g (x) satisfying all of Condition 2-1 to Condition 2-3 as follows may be used.

Condition 2-1: for x≥0, g(x) has a range of 0≤g(x)≤1

Condition 2-2: for x≥0, g(x) monotonously increases, and is differentiable

Condition 2-3: for x=0, g(x)=0 and g(x+$\varepsilon_1$) is infinitely close to 1

Here, $\varepsilon_1$ is a very small value that satisfies $\varepsilon_1$>0. Note that as shown in Condition 1-1 described above, the range of the activation function f is not negative, and therefore, it is possible to add a condition x≥0 to Condition 2-1 and to Condition 2-2 described above.

Note that Condition 2-1 described above expresses that g(x) can take a value that is 0 or more and 1 or less within a range in which the output of the neural network is limited to positive (x≥0). Further, "g(x) monotonously increases for x≥0" in Condition 2-2 described above is a condition to determine whether g(x) is close to 0 or close to 1 for x≥0, and means that as x becomes closer to 0, g(x) becomes closer to 0, and as x is greater than 0 and increases more, g(x) becomes closer to 1. Further, "differentiable" in Condition 2-2 described above shows that the gradient of g is calculatable. Furthermore, Condition 2-3 described above shows g(0)=0, and that, for x≥0, g(x) has an abrupt change (that is, when x increases in a range 0≤x≤$\varepsilon_1$, g(x) abruptly becomes close to 1) to determine whether g(x) is close to 0 or close to 1 for x≥0.

Furthermore, in order to prevent a feature space of the sparse features from being expressed by a specific low-dimensional partial space, a predetermined cost function may be added to the error function "loss" shown as the expression (3) described above. As the predetermined cost function, it is possible to use a cost function (specifically, a variance of $p_r$ with respect to r, or the like) that approximate a distribution of $p_r$ expressed by the expression (4) as follows to a specific distribution, for example.

$$p_r = \frac{\sum_{i \in B} \sigma'(x_r)}{|B|}$$

Here, B is a set of indexes i of training data ($Q_i$, $D_i^+$, $D_i^-$) included in a set of certain training data (for example, a mini batch in a case of mini batch learning, a training dataset in a case of batch learning, or the like).

As a further alternative of using a variance of $p_r$ to r as the cost function, for example, an appropriate probability distribution may be assumed, and the cost function may be determined by using an inter-distribution distance scale such as KL (Kullbach-Leibler) divergence. Furthermore, at this time, when a scale equivalent to an L0 norm such as an average of p r is included in the distribution parameters, a differentiable approximation function of an L0 norm does not have to be used as the cost function.

<Hardware Configuration>

Figure 8:
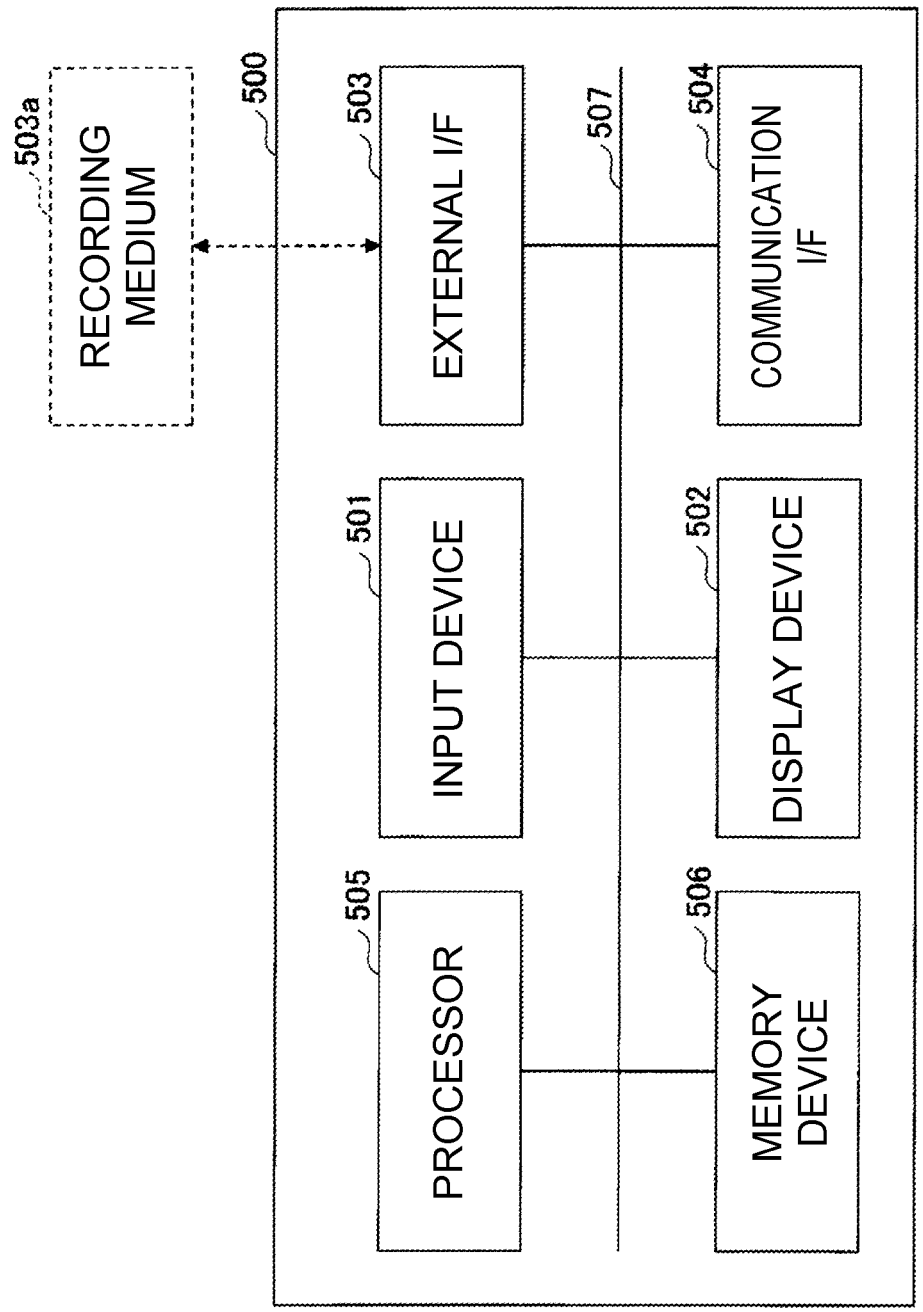
FIG. 8 is a diagram showing one example of a hardware configuration of a computer.

Finally, a hardware configuration of the search apparatus 10, the inverted index generation apparatus 20 and the learning apparatus 30 according to the present embodiment will be described. The search apparatus 10, the inverted index generation apparatus 20 and the learning apparatus 30 are realizable by a general computer or a hardware configuration of a computer system, and are realizable by a hardware configuration of a computer 500 shown in FIG. 8, for example. FIG. 8 is a diagram showing one example of the hardware configuration of the computer 500.

The computer 500 shown in FIG. 8 includes an input device 501, a display device 502, an external I/F 503, a communication I/F 504, a processor 505, and a memory device 506. Each of these pieces of hardware is connected to be communicable via a bus 507.

The input device 501 is, for example, a keyboard and a mouse, a touch panel or the like. The display device 502 is, for example, a display or the like. Note that the computer 500 does not have to have at least one of the input device 501 or the display device 502.

The external I/F 503 is an interface with an external device. The external device may be a recording medium 503a or the like. The computer 500 can read from and write to the recording medium 503a via the external I/F 503. In the recording medium 503a, one or more programs that realize the respective functional units possessed by the search apparatus 10 (the context coding unit 101, the sparse coding unit 102, the inverted index utilization unit 103 and the ranking unit 104) may be stored. Likewise, in the recording medium 503a, one or more programs that realize the respective functional units possessed by the inverted index generation apparatus 20 (the context coding unit 101, the sparse coding unit 102 and the inverted index generation unit 105) may be stored. Likewise, in the recording medium 503a, one or more programs that realize the respective functional units possessed by the learning apparatus 30 (the context coding unit 101, the sparse coding unit 102, the ranking unit 104, the division unit 106 and the update unit 107) may be stored.

Note that as the recording medium 503a, for example, a CD (Compact Disc), a DVD (Digital Versatile Disc), a SD memory card (Secure Digital memory card), a USB (Universal Serial Bus) memory card, or the like may be used.

The communication I/F 504 is an interface for connecting the computer 500 to a communication network. Note that one or more programs that realize the respective functional units possessed by the search apparatus 10 may be acquired (downloaded) from a predetermined server apparatus or the like via the communication I/F 504. Likewise, one or more programs that realize the respective functional units possessed by the inverted index generation apparatus 20 may be acquired from a predetermined server apparatus or the like via the communication I/F 504. Likewise, one or more programs that realize the respective functional units possessed by the learning apparatus 30 may be acquired from a predetermined server apparatus or the like via the communication I/F 504.

The processor 505 is an arithmetic operation device of any kind such as, for example, a CPU (Central Processing Unit (CPU) or a GPU (Graphics Processing Unit). The respective functional units possessed by the search apparatus 10 are realized by processes which one or more programs stored in the memory device 506 cause the processor 505 to execute, for example. Likewise, the respective functional units possessed by the inverted index generation apparatus 20 are realized by processes which one or more programs stored in the memory device 506 cause the processor 505 to execute, for example. Likewise, the respective functional units possessed by the learning apparatus 30 are realized by processes which one or more programs stored in the memory device 506 cause the processor 505 to execute, for example.

The memory device 506 is, for example, a storage device of any kind such as an HDD, an SSD, a RAM (Random Access Memory), a ROM (Read-Only Memory), or a flash memory.

The search apparatus 10 according to the present embodiment has the hardware configuration of the computer 500 shown in FIG. 8, and thereby can realize the aforementioned search process. Likewise, the inverted index generation apparatus 20 according to the present embodiment has the hardware configuration of the computer 500 shown in FIG.

8, and thereby can realize the aforementioned inverted index generation process. Likewise, the learning apparatus 30 according to the present embodiment has the hardware configuration of the computer 500 shown in FIG. 8, and thereby can realize the aforementioned training process. Note that the hardware configuration of the computer 500 shown in FIG. 8 is one example, and the computer 500 may have another hardware configuration. For example, the computer 500 may include a plurality of processors 505, or may include a plurality of memory devices 506.

The present invention is not limited to the above described embodiments specifically disclosed, and various modifications or changes, combinations with the known technologies or the like may be made without departing from the description of claims.

REFERENCE SIGNS LIST 10 search apparatus
20 inverted index generation apparatus
30 learning apparatus
101 context coding unit
102 sparse coding unit
103 inverted index utilization unit
104 ranking unit
105 inverted index generation unit
106 division unit
107 update unit
108 determination unit

The invention claimed is:

1. A learning apparatus comprising a processor configured to execute operations comprising:
receiving training data as input for training a neural network, wherein the training data include a search query, a set of documents to be searched based on the search query, a first document, and a second document as input, wherein the set of documents includes the first document and the second document, the first document is relevant to the search query, and the second document is irrelevant to the search query;
generating, based in the input, based on model parameters of the neural network, a query feature of the search query, a relevant document feature of the first document, and an irrelevant document feature of the second document; and
updating the model parameters of the neural network as the training of the neural network, based on the query feature of the search query, the relevant document feature of the first document, and the irrelevant document feature of the second document as input to a cost function, and based on an error function including the cost function, wherein the cost function uses a differentiable function that approximates an L0 norm, wherein, the differentiable function is represented by $g(x)$, x represents a sparse feature, and $g(x)$ satisfies all of the following conditions (a) to (c):
(a): for $x \geq 0$, $g(x)$ has a range of $0 \leq g(x) \leq 1$,
(b): for $x \geq 0$, $g(x)$ monotonously increases, and is differentiable, and
(c): for $x=0$, $g(x)=0$ and $g(x+\varepsilon 1)$ is substantially close to but not equal to 1, wherein $\varepsilon 1$ is substantially close to but not equal to zero by satisfying $\varepsilon 1 > 0$;
generating features of respective documents in the set of documents based on the updated model parameters; and
generating, based on the features of the respective documents as input, for each of the features included in the set, an inverted index, wherein the inverted index includes keys and values, the keys are based on indexes of dimensions corresponding to non-zero elements included in the each of the features, and the values are based on the non-zero elements and indexes of the documents corresponding to the each of the features.

2. The learning apparatus according to claim 1, wherein the cost function is associated with sparse features as input, and the sparse features comprise a first sparse feature of the query feature, a second sparse feature of the relevant document feature, and a third sparse feature of the irrelevant document feature.

3. A search apparatus comprising a processor configured to execute operations comprising:
receiving a search query as input;
generating a query feature of the search query based on pre-trained model parameters of a neural network, wherein the query feature of the search query is sparse, and the pre-trained models are pre-trained by:
generating, based on training data including a training search query as input, model parameters of the neural network, a relevant document feature of a first training document, and an irrelevant document feature of a second training document; and
updating the model parameters based on an error function including a cost function, the cost function is based on the relevant document feature and the irrelevant document feature, and the cost function uses a differentiable function that approximates an L0 norm, wherein the differentiable function is represented by $g(x)$, x represents a sparse feature, and $g(x)$ satisfies all of the following conditions (a) to (c):
(a): for $x \geq 0$, $g(x)$ has a range of $0 \leq g(x) \leq 1$,
(b): for $x \geq 0$, $g(x)$ monotonously increases, and is differentiable, and
(c): for $x=0$, $g(x)=0$ and $g(x+\varepsilon 1)$ is substantially close to but not equal to 1, wherein $\varepsilon 1$ is substantially close to but not equal to zero by satisfying $\varepsilon 1 > 0$; and
identifying, based on the query feature of the search query, a document based on an inverted index, wherein the document is associated with an index value as a value of the inverted index, the index value as the value of the inverted index is associated with an index having a dimension of a non-zero element of the query feature as a key of the inverted index, and the inverted index includes first indexes of respective dimensions of the query feature as keys and second indexes of documents to be searched as values.

4. A learning method of causing a processor to execute operations comprising:
receiving training data as input for training a neural network, wherein the training data include a search query, a set of documents to be searched based on the search query, a first document, and a second document as input, wherein the set of documents includes the first document and the second document, the first document is relevant to the search query, and the second document that is relevant to the search query;
generating, based on the input, based on model parameters of the neural network, a query feature of the search query, a relevant document feature of the first document, and an irrelevant document feature of the second document; and
updating the model parameters of the neural network as the training of the neural network, based on the query feature of the search query, the relevant document feature of the first document, and the irrelevant document feature of the second document as input to a cost function, and based on an error function including the cost function, wherein the cost function uses a differentiable function that approximates an L0 norm;

wherein, the differentiable function is represented by g(x), x represents a sparse feature, and g(x) satisfies all of the following conditions (a) to (c):
(a): for x≥0, g(x) has a range of 0≤g(x)≤1,
(b): for x≥0, g(x) monotonously increases, and is differentiable, and
(c): for x=0, g(x)=0 and g(x+ε1) is substantially close to but not equal to 1, wherein ε1 is substantially close to but not equal to zero by satisfying ε1>0;

generating features of respective documents in the set of documents based on the updated model parameters; and generating, based on the features of the respective documents as input, for each of the features included in the set, an inverted index, wherein the inverted index includes keys and values, the keys are based on indexes of dimensions corresponding to non-zero elements included in the each of the features, and the values are based on the non-zero elements and indexes of the documents corresponding to the each of the features.

5. A non-transitory computer-readable medium storing a program configured to cause a processor to execute operations comprising:

receiving training data as input for training a neural network, wherein the training data include a search query, a set of documents to be searched based on the search query, a first document, and a second document as input, wherein the set of documents includes the first document and the second document, the first document is relevant to the search query, and second document that is irrelevant to the search query;

generating, based on the input, based on model parameters of a neural network, a query feature of the search query, a relevant document feature of the first document, and an irrelevant document feature of the second document;

updating the model parameters of the neural network as the training of the neural network, based on the query feature of the search query, the relevant document feature of the first document, and the irrelevant document feature of the second document as input to a cost function, and based on an error function including the cost function, wherein the cost function uses a differentiable function that approximates L0 norm;

wherein, the differentiable function is represented by g(x), x represents a sparse feature, and g(x) satisfies all of the following conditions (a) to (c):
(a): for x≥0, g(x) has a range of 0≤g(x)≤1,
(b): for x≥0, g(x) monotonously increases, and is differentiable, and
(c): for x=0, g(x)=0 and g(x+ε1) is substantially close to but not equal to 1, wherein ε1 is substantially close to but not equal to zero by satisfying ε1>0;

generating features of respective documents in the set of documents based on the updated model parameters; and generating, based on the features of the respective documents as input, for each of the features included in the set, an inverted index, wherein the inverted index includes keys and values, the keys are based on indexes of dimensions corresponding to non-zero elements included in the each of the features, and the values are based on the non-zero elements and indexes of the documents corresponding to the each of the features.

* * * * *